(12) United States Patent
Kapur et al.

(10) Patent No.: US 9,596,092 B2
(45) Date of Patent: Mar. 14, 2017

(54) ON-DEMAND POWER MANAGEMENT IN A NETWORKED COMPUTING ENVIRONMENT

(71) Applicant: LENOVO Enterprise Solutions (Singapore) PTE. LTD., New Tech Park (SG)

(72) Inventors: Ashish Kapur, Santa Clara, CA (US); Nitin Huralikuppi, Santa Clara, CA (US); Rupal A. Kaneriya, Fremont, CA (US); Vishal Shukla, San Jose, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 159 days.

(21) Appl. No.: 14/671,487

(22) Filed: Mar. 27, 2015

(65) Prior Publication Data
US 2016/0285640 A1    Sep. 29, 2016

(51) Int. Cl.
*G06F 15/16*    (2006.01)
*H04L 12/10*    (2006.01)
*H04L 12/26*    (2006.01)
*H04L 12/24*    (2006.01)

(52) U.S. Cl.
CPC .............. *H04L 12/10* (2013.01); *H04L 41/12* (2013.01); *H04L 43/0876* (2013.01)

(58) Field of Classification Search
None
See application file for complete search history.

(56) References Cited

U.S. PATENT DOCUMENTS

| | | |
|---|---|---|
| 8,447,883 B1 | 5/2013 | Hasson et al. |
| 8,452,848 B1 | 5/2013 | Satish et al. |
| 8,595,379 B1 | 11/2013 | Brandwine |
| 2014/0059367 A1 | 2/2014 | Chan et al. |
| 2014/0075222 A1 | 3/2014 | Jackson |
| 2014/0129704 A1 | 5/2014 | Shikari et al. |

FOREIGN PATENT DOCUMENTS

EP    2680155 A1    1/2014

OTHER PUBLICATIONS

Zheng et al., "On-demand power management for ad hoc networks", Department of Compute Science, University of Illinois at Urbana-Champaign, Urbana, IL 61801, USA, 2003 Elsevier.

*Primary Examiner* — Ranodhi Serrao
(74) *Attorney, Agent, or Firm* — Kunzler Law Group (57) ABSTRACT

Methods, apparatuses, program products, and systems are disclosed for on-demand power management in a networked computing environment. A device module determines one or more non-critical devices of a plurality of devices of a software defined network. A non-critical device is determined based on one or more network characteristics of the device. A usage module receives a bandwidth utilization for each of the one or more non-critical devices. The bandwidth utilization includes an amount of network traffic associated with a non-critical device. A power module shuts down at least a portion of the software defined network comprising the one or more non-critical devices in response to the bandwidth utilizations for the one or more non-critical devices being less than a threshold bandwidth. The power module restarts portions of the software defined network that were shut down in response to bandwidth utilizations for different portions of the network exceeding a threshold bandwidth.

18 Claims, 6 Drawing Sheets

ON-DEMAND POWER MANAGEMENT IN A NETWORKED COMPUTING ENVIRONMENT

BACKGROUND

Field

The subject matter disclosed herein relates to power management and more particularly relates to power management in a software defined network.

Description of the Related Art

Networked computing environments, such as a software defined network, can include hundreds or thousands of network devices, such as switches, routers, bridges, servers, etc. Network computing environments may utilize redundancy to overcome a single point of failure and maintain a high availability. This may allow networked computing environments, such as data centers, facilitate network-wide resilience to increase scalable network connectivity while ensuring continuous operation of the system. However, large amounts of power may be consumed by both active and passive devices running within the networked computing environment.

BRIEF SUMMARY

An apparatus for on-demand power management in a networked computing environment is disclosed. A method and computer program product also perform the functions of the apparatus. In one embodiment, an apparatus includes a device module that determines one or more non-critical devices of a plurality of devices of a software defined network. A non-critical device may be determined based on one or more network characteristics of the device.

In a further embodiment, the apparatus includes a usage module that receives a bandwidth utilization for each of the one or more non-critical devices. The bandwidth utilization may include an amount of network traffic associated with a non-critical device. The apparatus may include a power module that shuts down at least a portion of the software defined network comprising the one or more non-critical devices in response to the bandwidth utilizations for the one or more non-critical devices being less than a threshold bandwidth.

The apparatus, in a further embodiment, includes a network module that determines a network topology of the plurality of devices of the software defined network. The network topology may describe an interconnectedness between the plurality of devices. In one embodiment, the network topology is determined based on network data received from each device of the software defined network. The network data for a device may include one or more of data that identifies the device and data that identifies one or more different devices that the device is connected to.

The network module may update the network topology based on one of network data received from each device connected to the software defined network and not receiving network data from a device that was previously part of the network topology and has been disconnected from the software defined network. In one embodiment, the apparatus includes a traffic module that re-routes network traffic intended for the portion of the software defined network being shutdown to portions of the software defined network that are not shut down based on the determined network topology.

In various embodiments, the apparatus includes a migration module that moves one or more virtual machines from the portion of the software defined network being shut down to portions of the software defined network that are not shut down based on the determined network topology. In certain embodiments, the network topology is determined using a link layer discovery protocol (LLDP). In some embodiments, the power module restarts the at least a portion of the software defined network comprising the one or more non-critical devices in response to the bandwidth utilizations for one or more different portions of the network being above a threshold bandwidth.

In one embodiment, the apparatus includes a threshold module that sets a threshold bandwidth for one or more of a portion of the software defined network and each device of the plurality of devices of the software defined network. In some embodiments, the usage module checks a bandwidth utilization of one or more non-critical devices at predetermined intervals and notifies the power module of a non-critical device that has a bandwidth utilization that is less than a bandwidth threshold for the non-critical device.

In certain embodiments, the apparatus includes a database module that maintains one or more databases associated with the plurality of devices of the software defined network. The one or more databases may store data associated with each device of the plurality of devices, such as a device identifier, a device type, a criticality status, a power status, a threshold bandwidth, a power strip identifier, and a power strip port. In various embodiments, the power module checks the one or more databases for a power strip identifier and a power strip port for each non-critical device of the portion of the software defined network being shut down and sends a signal to a power strip identified by a power strip identifier to shut down power for a device associated with a power strip port.

In one embodiment, the power module shuts down the at least a portion of the network by shutting down one of a non-critical device and a power supply for a non-critical device. In a further embodiment, the one or more network characteristics defining a non-critical device includes one or more of a bandwidth utilization of the non-critical device and a predefined status of the non-critical device.

A method, in one embodiment, includes determining, by use of a processor, one or more non-critical devices of a plurality of devices of a software defined network. A non-critical device may be determined based on one or more network characteristics of the device. In a further embodiment, the method includes receiving a bandwidth utilization for each of the one or more non-critical devices. The bandwidth utilization may include an amount of network traffic associated with a non-critical device.

The method may include shutting down at least a portion of the software defined network comprising the one or more non-critical devices in response to the bandwidth utilizations for the one or more non-critical devices being less than a threshold bandwidth. In one embodiment, the method includes determining a network topology of the plurality of devices of the software defined network. The network topology may describe an interconnectedness between the plurality of devices. In some embodiments, the network topology is determined based on network data received from each device of the software defined network. The network data for a device may include one or more of data that identifies the device and data that identifies one or more different devices that the device is connected to.

In one embodiment, the method includes restarting the at least a portion of the software defined network comprising the one or more non-critical devices in response to the bandwidth utilizations for one or more different portions of the network being above a threshold bandwidth. In a further embodiment, the method includes maintaining one or more databases associated with the plurality of devices of the software defined network. The one or more databases may store data associated with each device of the plurality of devices, such as a device identifier, a device type, a criticality status, a power status, a threshold bandwidth, a power strip identifier, and a power strip port.

A program product, in one embodiment, includes a computer readable storage medium that stores code executable by a processor. The executable code, in certain embodiments, includes code to perform determining one or more non-critical devices of a plurality of devices of a software defined network. A non-critical device may be determined based on one or more network characteristics of the device.

The executable code, in a further embodiment, includes code to perform receiving a bandwidth utilization for each of the one or more non-critical devices. The bandwidth utilization may include an amount of network traffic associated with a non-critical device. In one embodiment, the executable code includes code to perform shutting down at least a portion of the software defined network comprising the one or more non-critical devices in response to the bandwidth utilizations for the one or more non-critical devices being less than a threshold bandwidth.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
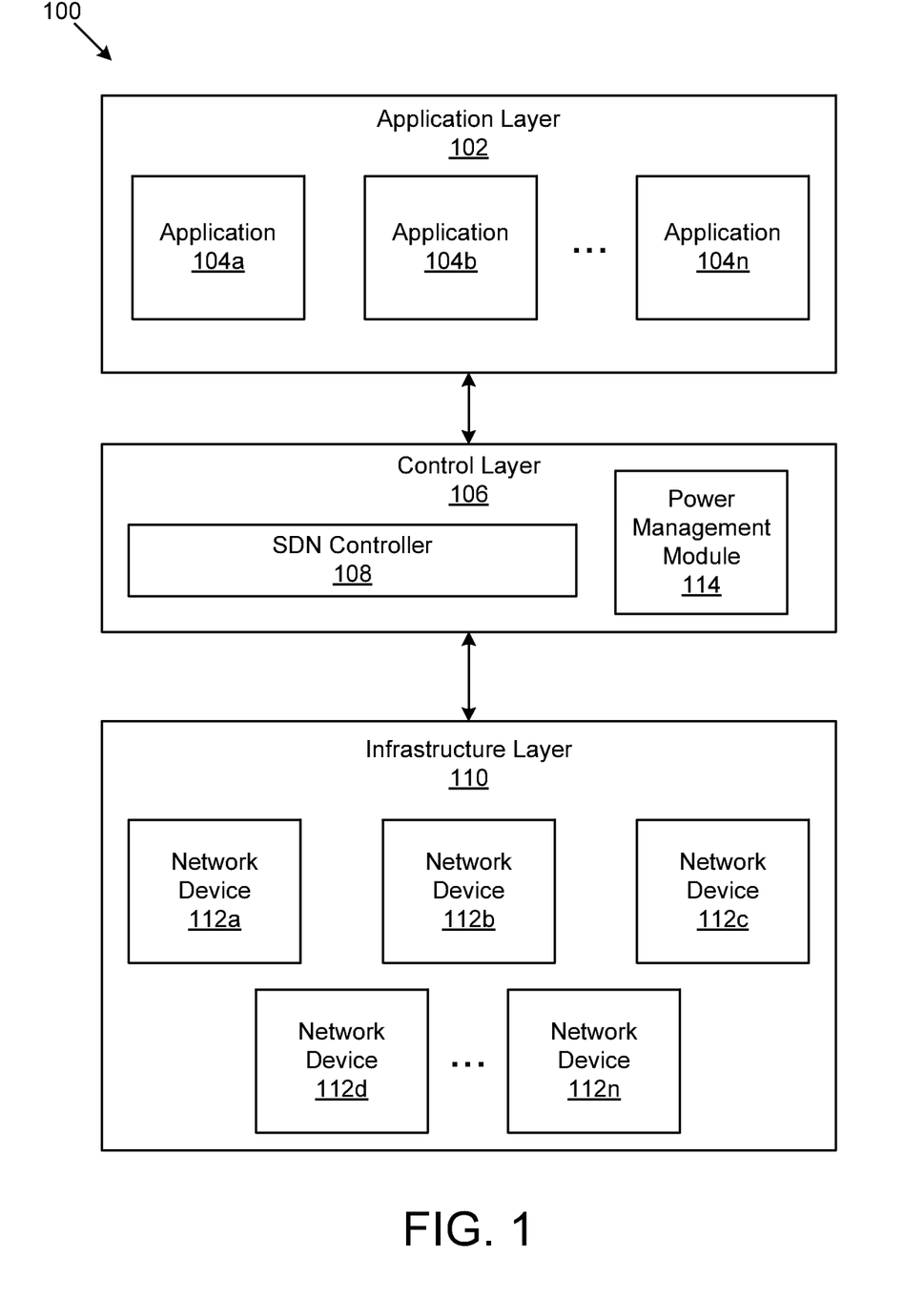
FIG. 1 is a schematic block diagram illustrating one embodiment of a system for on-demand power management in a networked computing environment.

FIG. 1 depicts one embodiment of a system 100 for on-demand power management in a networked computing environment. In one embodiment, the networked computing environment includes a software defined network ("SDN"). An SDN, as used herein, is a computer network that allows management of network services through abstraction of lower-level functionality, such as by decoupling the control plane (the part of the network that makes decisions about where traffic is sent) from the data plane (the part of the network that forwards traffic to selected destinations. Accordingly, an SDN controller 108 may provide programmatic interfaces into network equipment, such as switches and routers, which may traditionally be configured with closed, proprietary firmware. In this manner, manual interfaces into networking equipment can be replaced with a programmatic interface that can enable the automation of tasks, such as configuration and policy management, and also enable the network to dynamically respond to application requirements. The SDN may comprise a network environment in a data center where clients are accessing servers or other endpoints through the SDN. In another embodiment, the SDN may comprise a networked environment that facilitates the transmission of data between two or more clients.

The system 100, in one embodiment, includes an application layer 102, which includes one or more applications 104a-n, a control layer 106, which includes an SDN controller 108 and a power management module 114, and an infrastructure layer 110, which includes one or more network devices 112a-n.

In one embodiment, the application layer 102 includes an abstraction layer of the SDN that includes the applications or services 104a-n that utilize the SDN. In certain embodiments, the applications 104a-n communicate with the SDN controller 108 within the control plane 106 to plan, organize, orchestrate, automate, or the like the flow of traffic through the network devices 112a-n in the infrastructure layer 110. The SDN controller 108 may provide application programming interfaces ("APIs") that the applications 104a-n can use to programmatically customize and optimize the SDN for different uses. For example, the applications 104a-n may include network load balancers, switch/network virtualization applications, firewalls, software-defined security services, or the like that could be optimized in an SDN environment.

In one embodiment, the control layer 106 includes an abstraction layer of the SDN that controls the flow of traffic through the SDN (through the infrastructure layer 110, for example). In particular, the control layer 106 may include an SDN controller 108 that acts as a strategic control point for the SDN and controls the flow of network packets through the infrastructure layer 110. The SDN controller 108 may include a power controller or act as a power controller to communicate with one or more power supplies within the SDN.

The SDN controller 108, in certain embodiments, is configured to relay information to the network devices 112a-n in the infrastructure layer 110 and the applications 104a-n in the application layer 102. For example, the SDN controller 108 may dynamically make network packet routing changes in the infrastructure layer 110 according to the needs and/or demands of the applications 104a-n. In this manner, by separating the control layer 106 from the infrastructure layer 110, unlike traditional networking configurations, more sophisticated traffic management is possible instead of using access control lists and routing protocols.

The SDN controller 108 may communicate with the network devices 112a-n in the infrastructure layer 110 using different communication protocols and APIs that defines how the SDN controller 108 communicates with the network devices 112a-n in the infrastructure layer 110 to make adjustments to the packet routing/forwarding paths as determined by the needs of the applications 104a-n. Examples of communication protocols between the SDN controller 108 and the network devices 112a-n include OpenFlow® by the Open Networking Foundation and OpFlex by Cisco®. OpenFlow®, for example, allows remote administration of packet forwarding tables, by adding, modifying and removing packet matching rules and actions. In this manner, routing decisions can be made periodically or ad hoc by the SDN controller 108 and translated into rules and actions.

In one embodiment, the power management module 114 is configured to determine one or more non-critical network devices 112a-n of the SDN, receive a bandwidth utilization of the non-critical network devices 112a-n, and shut down power to at least a portion of the SDN that includes non-critical network devices 112a-n that have network bandwidths below a predefined threshold bandwidth. In this manner, portions of the SDN that include non-critical network devices 112a-n that are not actively being used or are being under-utilized may be shut down in order to conserve power within the SDN. In certain embodiments, at least a portion of the power management module 114 is located on the SDN controller 108.

The infrastructure layer 110 comprises an abstraction layer of the SDN that includes a plurality of network devices 112a-n that perform forwarding of network traffic through the SDN according to the packet routing paths determined by the SDN controller 108. As described above, the SDN controller 108 is in communication with the network devices 112a-n of the infrastructure layer 110 using a communications protocol such as OpenFlow®.

In one embodiment, the network devices 112a-n may comprise networking equipment and endpoints, such as switches, routers, bridges, firewalls, servers, virtual machines, hypervisors, or the like. In some embodiments, the network devices 112a-n are critical or non-critical devices 112a-n. As used herein, a critical device 112a-n is a network device 112a-n that is necessary to the reliability of the SDN and cannot be shut down without causing negative side effects. A non-critical device 112a-n, as used herein, includes a network device 112a-n that can be shut down, to conserve power for example, without threatening the reliability and integrity of the SDN.

Figure 2:
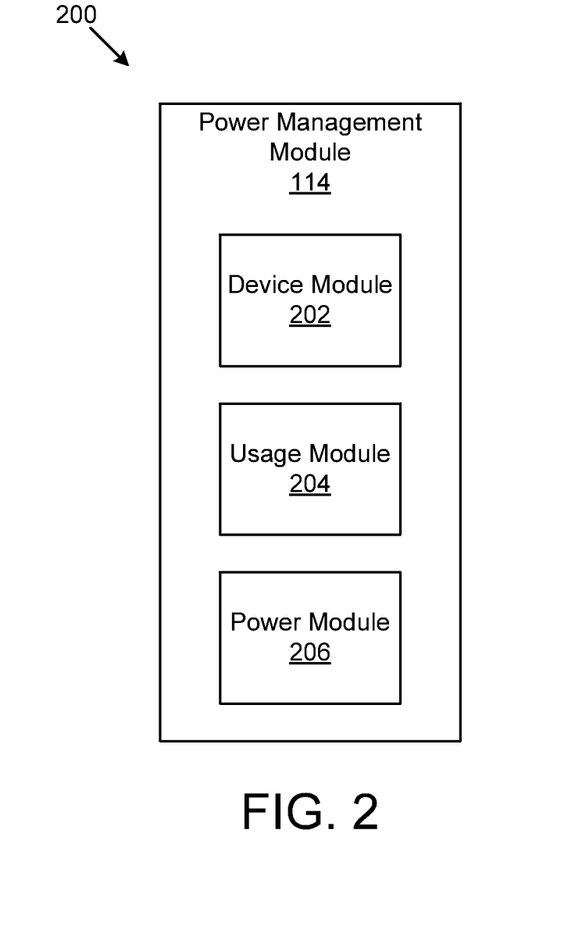
FIG. 2 is a schematic block diagram illustrating one embodiment of a module for on-demand power management in a networked computing environment.

FIG. 2 depicts one embodiment of a module 200 for on-demand power management in a networked computing environment. In one embodiment, the module 200 includes an embodiment of a power management module 114. The power management module 114, in various embodiments, includes one or more of a device module 202, a usage module 204, and a power module 206, which are described in more detail below.

The device module 202, in one embodiment, determines one or more non-critical devices 112a-n of a plurality of devices 112a-n of an SDN. As described above, the plurality of devices 112a-n may include networking components and/or endpoints, such as switches, routers, bridges, firewalls, servers, virtual machines, hypervisors, and/or the like. In certain embodiments, the network devices 112a-n are connected to a power supply, such as a power strip, an uninterruptible power supply (e.g., a battery backup), a power distribution unit, or the like. In some embodiments, the power supply is connected to the SDN, such as an IP or remote managed power strip, and managed by the SDN controller 108. For example, the SDN controller 108 may command the power strip to turn off or may command the power strip to turn off specific ports/outlets.

A non-critical device 112a-n, as described above, is a network device 112a-n that is less critical or not critical to the functionality of the SDN in terms of resource usage or load provisioning, for example. For example, a switch that is servicing less than 1% of the load on the SDN may be considered a non-critical device 112a-n because the switch could be shut down or otherwise disabled and the load being handled by the switch could be re-routed to a different portion of the SDN. On the other hand, a critical device 112a-n is a network device 112a-n that is necessary to the functionality of the SDN. For example, a firewall that monitors all incoming and outgoing network traffic may be considered a critical device 112a-n that may not be shut down without negative side effects on the SDN, such as inaccessibility of other network devices 112a-n.

In one embodiment, the device module 202 determines a non-critical device 112a-n based on one or more network characteristics of the device 112a-n. In certain embodiments, the network characteristics include a predefined status of the device 112*a-n*. For example, a network administrator may designate a switch in the SDN as a non-critical device 112*a-n* by setting an indicator stored in the switch, such as a flag, to a non-critical status. Alternatively, the network administrator may set the indicator of a firewall to a critical status. The device module 202 may check the indicator to determine whether the device 112*a-n* has been designated as a critical or non-critical device 112*a-n*.

In certain embodiments, the network characteristics include a bandwidth utilization for a network device 112*a-n*. In certain embodiments, if a bandwidth utilization for a network device 112*a-n* is below a predetermined threshold bandwidth, the network device 112*a-n* may be classified as a non-critical network device 112*a-n*. In a further embodiment, the device module 202 may determine a non-critical device 112*a-n* based on a network topology of the SDN, as described in more detail below. For example, if the device module 202 determines that a switch has a network bandwidth below a predetermined level and there are alternative network paths to devices 112*a-n* connected to the switch in the network topology, the switch may be designated as a non-critical device 112*a-n*. The device module 202 may periodically check and update which devices 112*a-n* are critical or non-critical devices 112*a-n*.

In one embodiment, the network characteristics include a number of data paths associated with a network device 112*a-n*. As used herein, a data path may comprise a path that data travels from one endpoint to another endpoint using one or more network devices 112*a-n*. In some embodiments, if the number of active data paths through the SDN is below a predetermined threshold, the network devices 112*a-n* associated with the data paths may be considered critical network devices 112*a-n*. For example, if the SDN only has a single active data path, each network device 112*a-n* along the data path may be considered a critical device 112*a-n*.

On the other hand, if the number of data paths exceeds a predetermined threshold, which may indicate that there are unnecessary data paths in the SDN, the device module 202 may designate one or more network devices 112*a-n* along redundant data paths as non-critical devices 112*a-n*. Because the SDN is a dynamically configured network environment, the number of data paths and the network devices 112*a-n* associated with data paths may change over time. Accordingly, the device module 202 may update the criticality designations of devices 112*a-n* over time such that a device 112*a-n* that was previously a non-critical device 112*a-n* may become a critical device 112*a-n*, and vice versa.

In one embodiment, the usage module 204 receives a bandwidth utilization for each of the one or more non-critical devices 112*a-n* in the SDN. A bandwidth utilization, as used herein, includes an amount of network traffic, e.g., an amount of packets or bits of information, that a network device 112*a-n* consumes over a period of time. In certain embodiments, the usage module 204 queries, polls, or otherwise checks a bandwidth utilization of the non-critical devices 112*a-n*. In a further embodiment, the non-critical devices 112*a-n* send their network bandwidths to the usage module 204 at predetermined intervals or at various periods of time.

In one embodiment, the power module 206 shuts down at least a portion of the SDN comprising one or more non-critical devices 112*a-n* that have a bandwidth utilization below a threshold bandwidth. In certain embodiments, the power module 206 is in communication with a power supply, such as a power strip, that is connected to a non-critical device 112*a-n* with a low bandwidth utilization and sends a command to the power strip to shut down the supply of power to the non-critical device 112*a-n*. For example, the power module 206 may send a command to the power strip to shut down power to a switch identified by an IP or MAC address and located on port four of the power strip. In such an embodiment, not only does the power module 206 send a command to shut down the switch, but the power module 206 may also send commands to shut down any devices 112*a-n* connected to the switch that are also non-critical devices 112*a-n*. In a further embodiment, the power module 206 is in direct communication with a non-critical device 112*a-n* with a low bandwidth utilization and sends a shut-down command to the non-critical device 112*a-n*.

In one embodiment, the usage module 204 checks a bandwidth utilization of one or more non-critical devices 112*a-n* and notifies the power module 206 if a non-critical device 112*a-n* has a bandwidth utilization that is lower than the bandwidth threshold. For example, the usage module 204 may periodically receive the bandwidth utilizations of the devices 112*a-n* in the SDN and may determine whether the received bandwidth utilizations are below a threshold bandwidth. If so, the usage module 204 may notify the power module 206 which non-critical devices 112*a-n* have bandwidths below the threshold so that the power module 206 can shut down the non-critical devices 112*a-n* to conserve power in the SDN.

In one embodiment, the usage module 204 monitors a total, overall bandwidth utilization of the SDN. In such an embodiment, if the total bandwidth utilization of the SDN is below a total bandwidth threshold for the SDN, the power module 206 may shut down portions of the network comprising non-critical devices 112*a-n*. For example, if the total bandwidth threshold is set to a 60% bandwidth utilization or capacity for the SDN and the usage module 204 determines that the bandwidth utilization of the SDN is at 30%, the power module 206 may shut down portions of the SDN comprising non-critical devices 112*a-n*, such as by shutting down one or more switches and/or routers, because these portions of the SDN may be unnecessary to effectively service the bandwidth load of the SDN.

In one embodiment, the power module 206 restarts the at least a portion of the SDN comprising a non-critical device 112*a-n* in response to the bandwidth utilizations for one or more different portions of the SDN being above a threshold bandwidth. For example, if the load on SDN reaches a threshold bandwidth, the power module 206 may send commands to bring up or restart non-critical devices 112*a-n* in portions of the SDN that have been shut down to balance the load on the SDN. For example, the load on the SDN may require additional routers to service the load on the SDN by routing network traffic to portions of the SDN that have been shut down. The power module 206 may send a command to a power strip and/or the router to start the router and/or any additional devices 112*a-n*, such as servers, switches, etc. to facilitate in balancing the load on the SDN. If the power module 206 sends a command to start a server that is connected to a switch, for example, the power module 206 may also send a command to the power strip to start the switch connected to the server.

In this manner, the power management module 114 is able to effectively manage the power consumption in the SDN without negatively affecting the high availability and load balancing of the SDN. Moreover, the power management module 114 can dynamically adjust the power consumption by shutting down or turning on devices 112*a-n* as necessary to meet the needs and demands of the load on the SDN.

Figure 3:
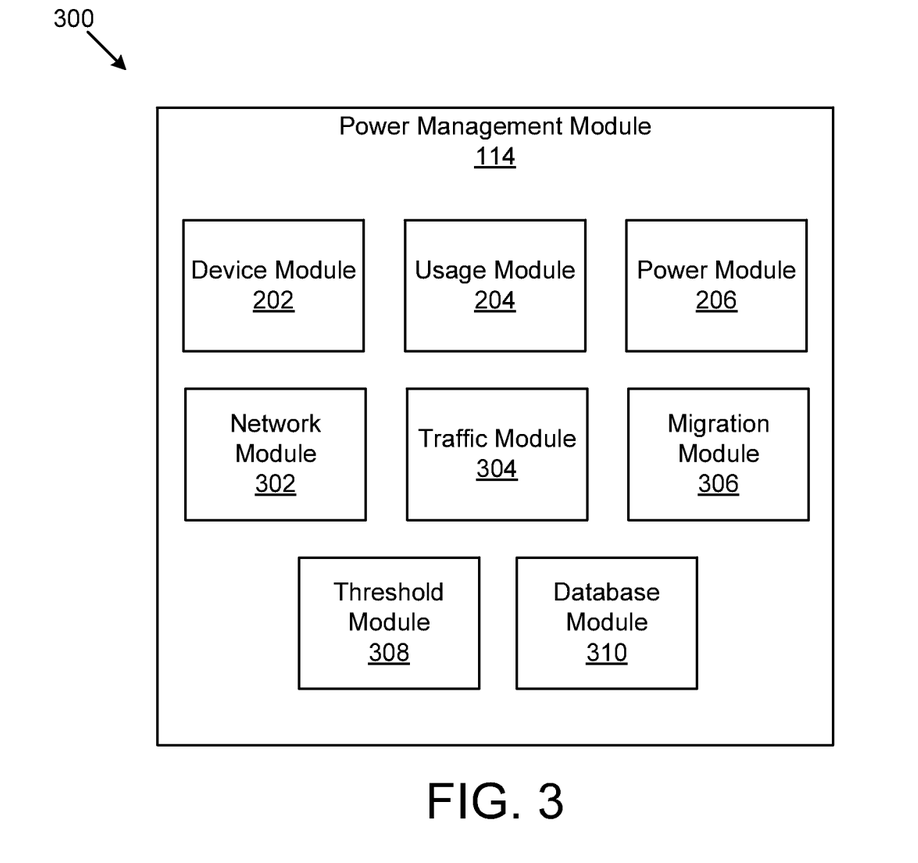
FIG. 3 is a schematic block diagram illustrating one embodiment of another module for on-demand power management in a networked computing environment.

FIG. 3 depicts one embodiment of another module 300 for on-demand power management in a networked computing environment. In one embodiment, the module 300 includes an embodiment of a power management module 114. The power management module 114 may include one or more of a device module 202, a usage module 204, and a power module 206, which may be substantially similar to the device module 202, the usage module 204, and the power module 206 described above with reference to FIG. 2. In a further embodiment, the power management module 114 includes one or more of a network module 302, a traffic module 304, a migration module 306, a threshold module 308, and a database module 310, which are described in more detail below.

Figure 4:
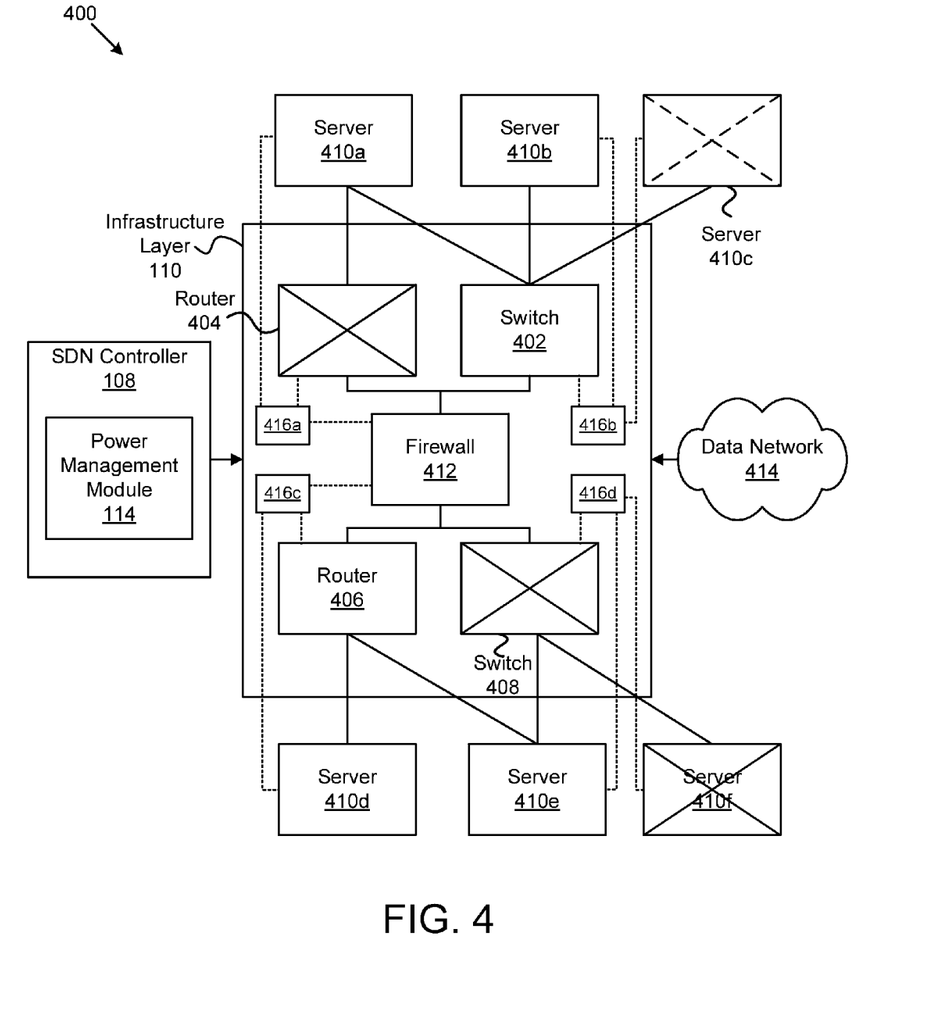
FIG. 4 is a schematic block diagram illustrating one embodiment of a software defined network environment for on-demand power management in a networked computing environment.

The network module 302, in one embodiment, determines a network topology of the plurality of network devices 112a-n of the SDN. As used herein, a network topology is a mapping of the interconnectedness between the plurality of network devices 112a-n, as shown in FIG. 4, such that the flow of network traffic can be mapped through the SDN. For example, using the network topology, the SDN controller 108 may map the best path for data to reach a particular endpoint, which may traverse a number of switches, routers, bridges, firewalls, or the like.

In one embodiment, the network module 302 determines the network topology based on network data received from each network device 112a-n of the SDN. The network data, in certain embodiments, includes identification data for a network device 112a-n, identification data for one or more network devices 112a-n that may be connected to the network device 112a-n, and/or the like. For example, a switch may send its MAC address or IP address, and the MAC/IP addresses of the network devices 112a-n that are connected to it. In this manner, the network module 302 can generate a topology or map of the SDN based on the network data received from each of the devices 112a-n of the SDN.

In certain embodiments, the network module 302 updates the network topology based on network data received from each device 112a-n connected to the SDN. For example, the network module 302 may poll or query each device 112a-n for its network data at predetermined intervals to determine whether a device 112a-n has been added to the SDN, removed from the SDN, shut down, started, or the like, which would modify the topology of the SDN. In certain embodiments, the network module 302 updates the network topology in response to a network event, such as if a device 112a-n has been added to the SDN, removed from the SDN, shut down, started, or the like. For example, in response to a switch being connected to the SDN (or restarted if previously shutdown), the network module 302 may query or poll each device 112a-n for its network data.

In some embodiments, the network module 302 receives network data periodically from the network devices 112a-n. For example, the network devices 112a-n may send network data to the network module 302 once a day, every hour, every fifteen minutes, after an event, or the like. In some embodiments, the network module 302 updates the network topology in response to not receiving network data form a device 112a-n that was previously part of the network topology and has been disconnected from the SDN. For example, if the network module 302 previously detected and mapped a server as part of the network topology, the network module 302 may remove the server from the network topology in response to not receiving network data from the server at a later point in time.

In one embodiment, the network module 302 determines the network topology using a link layer protocol such as the link layer discovery protocol ("LLDP"). As used herein, LLDP is a link layer protocol used by network devices 112a-n to share their identities, capabilities, and device 112a-n connections with other devices 112a-n (such as the SDN controller 108). In some embodiments, if the SDN or a device 112a-n in the SDN does not support LLDP, or another link layer protocol, the network module 302 may determine a device's 112a-n identity based on the power strip/supply that the device 112a-n is connected to. For example, the network module 302 may determine which devices 112a-n are powered-on by checking the ports of the power strip that the devices 112a-n are connected to. The network module 302 may then check a MAC address table that maps the MAC address of a device 112a-n to the port on the power strip that the device 112a-n is connected to in order to determine the device's 112a-n identity.

In one embodiment, the traffic module 304 re-routes network traffic, based on the network topology, that is intended for a portion of the SDN that is being shut down to one or more portions of the SDN that are not shut down. For example, the traffic module 304 may re-route network traffic intended for an application executing on a virtual machine on Server A to a redundant version of the application executing on a different virtual machine on Server B in response to the power module 206 shutting down Server A. The traffic module 304 may check the network topology to determine an appropriate path and/or endpoint to re-route the traffic.

In one embodiment, the migration module 306 moves one or more virtual machines, based on the network topology, from the portion of the SDN being shut down to portions of the SDN that are not shut down. For example, the migration module 306 may migrate a virtual machine executing on Server A to a Server B in response to the power module 206 shutting down Server A. The migration module 306 may check the network topology to determine an appropriate destination for the one or more virtual machines being migrated.

In one embodiment, the threshold module 308 sets a threshold bandwidth for the SDN and/or each device 112a-n of the SDN. As used herein, the threshold bandwidth for the entire SDN may describe the load or capacity that the SDN can effectively process at its current configuration. If the bandwidth at a point in time exceeds the threshold, the threshold module 308 may notify the SDN controller 108 and/or the power module 206 to bring on additional resources by starting devices 112a-n at different portions of the SDN. For example, if the threshold module 308 determines that the bandwidth utilization of the SDN exceeds a predetermined bandwidth threshold for the SDN, the threshold module 308 may notify the power module 206 to bring up one or more switches, routers, and/or servers in different portions of the SDN to handle the additional load on the SDN.

In a further embodiment, the threshold module 308 may set individual bandwidth thresholds for each device 112a-n in the SDN. For example, the threshold module 308 may set a bandwidth threshold for Switch A to X and a bandwidth threshold for Switch B to Y. Thus, if the bandwidth utilization on Switch A exceeds X, the threshold module 308 may notify the power module 206 to bring up one or more additional network devices 112a-n to handle some of the load on Switch A.

In one embodiment, the threshold module 308 sets different bandwidth thresholds for different portions of the SDN. For example, the threshold module 308 may set a lower bandwidth threshold, such as 20%, to a portion of the SDN controlled by a switch that typically services 50% of the SDN traffic than a different portion of the SDN controlled by a switch that typically services 5% of the SDN traffic, which may be assigned a bandwidth threshold of 90%. In such an embodiment, by assigning a lower bandwidth threshold to a portion of the SDN that handles a higher proportion of the load on the SDN assures that that portion of the SDN will generally remain active or reliable unless the bandwidth utilization on that portion of the SDN falls below the threshold bandwidth. This may prevent the devices 112a-n on portions of the SDN from being cyclically shut down and restarted, which may cause unnecessary wear and tear on the devices 112a-n.

In certain embodiments, the threshold module 308 sets the bandwidth thresholds based on user input. For example, the threshold module 308 may receive or determine a threshold bandwidth based on input received from a network administrator. In another embodiment, the threshold module 308 sets the bandwidth thresholds based on a history of network traffic on the SDN, and may fluctuate the bandwidth thresholds during the life of the SDN. For example, the threshold module 308 may determine periods throughout a day when the network load on the SDN is at its highest, such as during business hours, and lowest, such as at night, based on historical bandwidth data, and may adjust the bandwidth thresholds throughout the day. Accordingly, the power module 206, in response to the changing bandwidth thresholds, may shut down devices 112a-n to conserve power and/or bring on devices 112a-n to handle the load on the SDN.

The threshold module 308 may track a bandwidth utilization for the SDN over various periods of time, such as over the past year, the past six months, the past month, the past two weeks or the like in order to predict optimal threshold bandwidths for the SDN. Similarly, the threshold module 308 may track a bandwidth utilization for portions of the SDN or for individual devices 112a-n within the SDN over a period of time in order to predict optimal threshold bandwidths for portions of the SDN or devices within the SDN. Based on the historical bandwidth data and/or the current utilizations of the portions and/or devices 112a-n of the SDN, the threshold module 308 may set the bandwidth thresholds for the portions and/or devices 112a-n of the SDN.

The threshold module 308 may calculate different bandwidth thresholds using different historical data to determine the optimal threshold bandwidth for the SDN, portions of the SDN, and/or the devices 112a-n within the SDN. Accordingly, as the bandwidth utilization on the SDN fluctuates, the threshold module 308 may calculate new threshold bandwidths for the SDN, the portions of the SDN, and/or the devices 112a-n within the SDN. For example, the threshold module 208 may update the threshold bandwidths at predetermined intervals, such as every minute, every hour, or the like. The threshold module 308 may also update the threshold bandwidths in response to an event, such as a bandwidth utilization on the SDN exceeding a predetermined level, or in response to a signal/notification from a device 112a-n, the SDN controller 108, or the like.

In one embodiment, the database module 310 maintains one or more databases associated with the plurality of devices 112a-n of the SDN. The one or more databases store data associated with each device 112a-n of the plurality of devices 112a-n such as a device identifier, a device type, a criticality status, a power status, a threshold bandwidth, a power strip identifier, and a power strip port.

A device identifier may include a unique identifier for a device 112a-n, such as a MAC address, an IP address, or the like. The device type may include an indicator that identifies a type for a network device 112a-n, such as a switch, a router, a bridge, a firewall, a server, or the like. The criticality status may indicate whether a device 112a-n is a critical or non-critical device 112a-n. The power status may indicate whether a device 112a-n is powered on or off. The threshold bandwidth may include a threshold bandwidth for a device 112a-n such that if the utilized bandwidth of the device 112a-n falls below the threshold bandwidth the power module 206 can shut down the device 112a-n. The power strip identifier may include an identifier for a power strip in the SDN, such as a MAC address, IP address, or the like, that a device 112a-n is connected to. The power strip port may identify the port on a power strip that a device 112a-n is connected to.

In one embodiment, the database module 310 maintains a physical inventory database that includes a list of all devices 112a-n in the SDN. In some embodiments, the database module 310 populates the physical inventory database in response to the network module 302 determining the topology of the devices 112a-n of the SDN. The physical inventory database, for example, may include an identifier for each device 112a-n, a type for each device 112a-n, a power strip identifier, and a power strip port. The database may also include a timer that indicates the last time that the device 112a-n sent its network data to the SDN controller 108. At expiration of the timer, the device 102a-n may be configured to send its network data to the SDN controller 108 (e.g., the usage module 204) such that the power module 206 can make a determination regarding the criticality of the device 112a-n.

In one embodiment, the database module 310 maintains a database of critical devices 112a-n of the plurality of devices 112a-n of the SDN. The database of critical devices 112a-n includes a list of one or more devices 112a-n of the SDN that cannot be shut down. Implicitly, this means that the devices 112a-n in the physical inventory database that are not included in the critical device 112a-n database are the non-critical devices 112a-n, which may be shut down to conserve power consumption. The critical device 112a-n database may contain a unique identifier for each critical device 112a-n, a timer that indicates the last time that the critical device 112a-n sent its network data to the SDN controller 108, a type of the critical device 112a-n, and a "high water mark" that indicates a threshold bandwidth such that if the bandwidth utilization exceeds the threshold, the critical device 112a-n sends a notification to the SDN controller 108 to allocate more resources (e.g., the point at which the power module 206 brings up non-critical devices 112a-n that are shut down).

In a further embodiment, the database module 310 maintains a database of devices 112a-n in the SDN that can be shut down, e.g., non-critical devices 112a-n. The non-critical device database may include a unique identifier for each non-critical device 112a-n, a timer that indicates the amount of time that has passed since the non-critical device 112a-n was shut down, a type of the non-critical device 112a-n, and a "high water mark" that indicates a threshold bandwidth for the non-critical device 112a-n such that if the bandwidth utilization is below the threshold, the non-critical device 112a-n becomes a candidate for being shut down by the power module 206.

In certain embodiments, the power module 206 checks the databases to determine which of the devices 112a-n can be shut down, and, in response to determining a non-critical device 112a-n that can be shut down, receives a power strip identifier and a power strip port associated with a non-critical device 112*a-n* that can be shut down. The power module 206 may then send a signal or command to the identified power strip to shut down power to the non-critical device 112*a-n* associated with the received power strip port.

The database module 310, in some embodiments, updates the physical inventory database in response to devices 112*a-n* being added and/or removed to/from the SDN, e.g., in response to the device module 202 determining devices 112*a-n* that have been added or removed from the SDN. Similarly, the database module 310 updates the critical device database in response to a change in the SDN configuration, a status of a device 112*a-n* being changed to/from a critical device 112*a-n* to a non-critical device 112*a-n*, or the like. The database module 310 may update the non-critical device database in response to non-critical devices 112*a-n* being shut down or powered-on, or the like.

FIG. 4 depicts one embodiment of a software defined network environment 400 for on-demand power management in a networked computing environment. In certain environments, the SDN environment 400 may comprise an example of a networked environment in a data center. In one embodiment, the SDN environment 400 includes an SDN controller 108, including a power management module 114, a data network 414, and an infrastructure layer 110. The infrastructure layer 110 may include switches 402/408, routers 404/406, a firewall 412, and one or more power strips 416*a-d*. The SDN environment 400 may also include a plurality of servers 410*a-f*. In some embodiments, the SDN controller 108 configures the flow of data packets from/to the data network 414 through the devices 402-410*f* of the infrastructure layer 110.

In one embodiment, the device module 202 determines which devices 402-410*f* are non-critical devices based on network characteristics of the devices 402-410*f*. For example, a router 404 may be a non-critical device because it is only connected to a single server 410*a* that is also connected to a switch 402 such that if the router 404 were to be shut down, the server 410*a* would still be reachable through the switch 402. In another example, a server 410*f* may be designated as a non-critical device by a network administrator, or the like. Certain devices may be considered critical devices such that the availability of the SDN would be negatively impacted if they were to be shut down, such as the firewall 412.

The usage module 204, in a further embodiment, receives a bandwidth utilization from each device 402-410*f* in the SDN environment 400 to determine which devices 402-410*f* are being over- or under-utilized. In response to the bandwidth utilizations, the power module 206 may send commands to the power strips 416*a-d* to shut down or power up certain devices 402-410*f*.

For example, if the bandwidth of a router 404 that is a non-critical device falls below a bandwidth threshold, the power module 206 may send a shutdown signal to the power strip 416*a* connected to the router 404. In some embodiments, the power module 206 queries the database of non-critical devices to determine the power strip identifier and power strip port associated with the router 404 being shut down. Even though the router 404 is shut down, the server 410*a* connected to the router 404 is still accessible via a switch 402. In this manner, the power management module 114 can conserve power within the SDN, by shutting down unnecessary devices 402-410*f*, without negatively impacting the availability of the resources of the SDN.

In another example, the bandwidth utilization of a server 410*f* may fall below a bandwidth threshold, and the power module 206 may send a shutdown command to the power strip 416*d* connected to the server 410*f*. In addition, the power module 206 may determine, based on the network topology, that the switch 408 connected to the server 410*f* is also a non-critical device and that it can also be shut down because the other server 410*e* connected to the switch 408 can be accessed through a router 406. Thus, the power module 206 may send a shutdown signal to the power strip 416*d* connected to the switch 408 so that the switch can be shut down as well. In response to a device 402-410*f* being shut down, the traffic module 304 may re-route traffic intended for the device 402-410*f* being shut down to a different portion of the SDN that is not shut down.

In a further embodiment, the power module 206 may determine that the bandwidth utilization of one or more active servers 410*a-b*, 410*d-e* has exceeded a predetermined bandwidth threshold. In such an embodiment, the power module 206 may send a power-on command to the power strip 416*b* connected to a server 410*c* that is shut down such that the server 410*c* can be powered on to handle some of the load on the SDN. The database module 310 may update the status of the devices 402-410*f* that have been shut down or powered on in the SDN in the various databases that it maintains.

Figure 5:
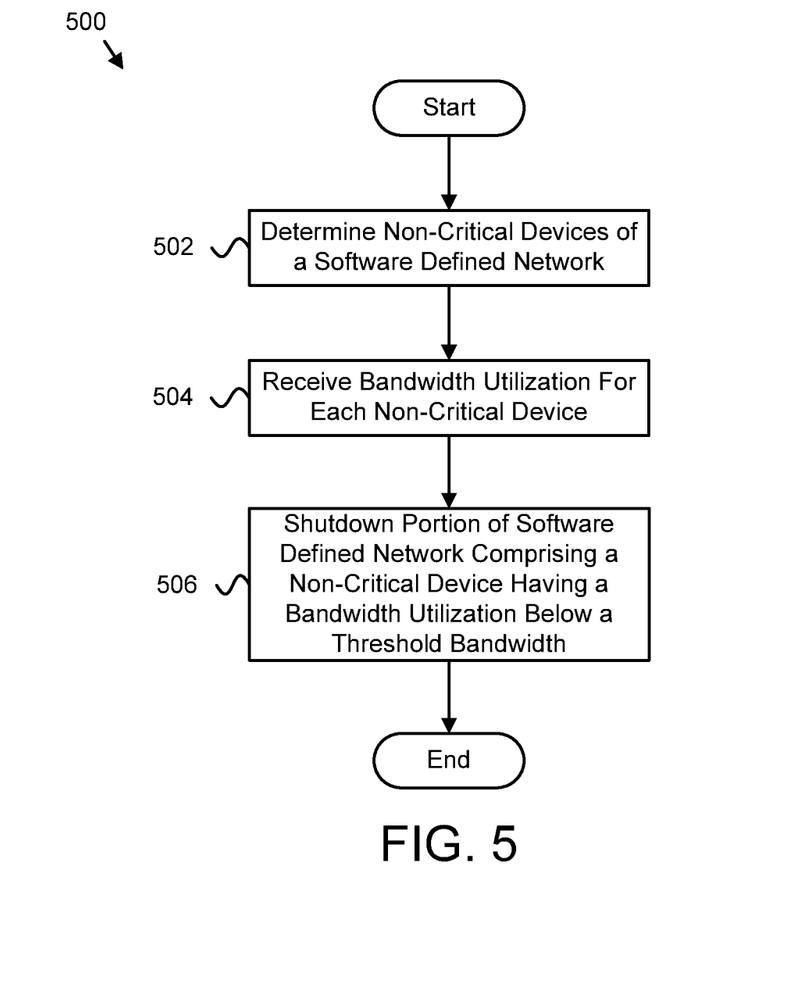
FIG. 5 is a schematic flow chart diagram illustrating one embodiment of a method for on-demand power management in a networked computing environment.

FIG. 5 is a schematic flow chart diagram illustrating one embodiment of a method 500 for on-demand power management in a networked computing environment. In one embodiment, the method 500 begins and determines 502 one or more non-critical devices 112*a-n* of a plurality of devices 112*a-n* of an SDN. In one embodiment, the device module 202 determines 502 one or more non-critical devices 112*a-n* of a plurality of devices 112*a-n* of an SDN. The device module 202 may determine 502 a non-critical device 112*a-n* based on one or more network characteristics of the device 112*a-n*.

In one embodiment, the method 500 receives 504 a bandwidth utilization for each of the one or more non-critical devices 112*a-n*. In some embodiments, the usage module 204 receives 504 a bandwidth utilization for each of the one or more non-critical devices 112*a-n*. The bandwidth utilization may include an amount of network traffic associated with a non-critical device 112*a-n*.

In a further embodiment, the method 500 shuts down 506 at least a portion of the SDN comprising the one or more non-critical devices 112*a-n* in response to the bandwidth utilizations for the one or more non-critical devices 112*a-n* being less than a threshold bandwidth. In one embodiment, the power module 206 shuts down 506 at least a portion of the SDN comprising the one or more non-critical devices 112*a-n*, and the method 500 ends.

Figure 6:
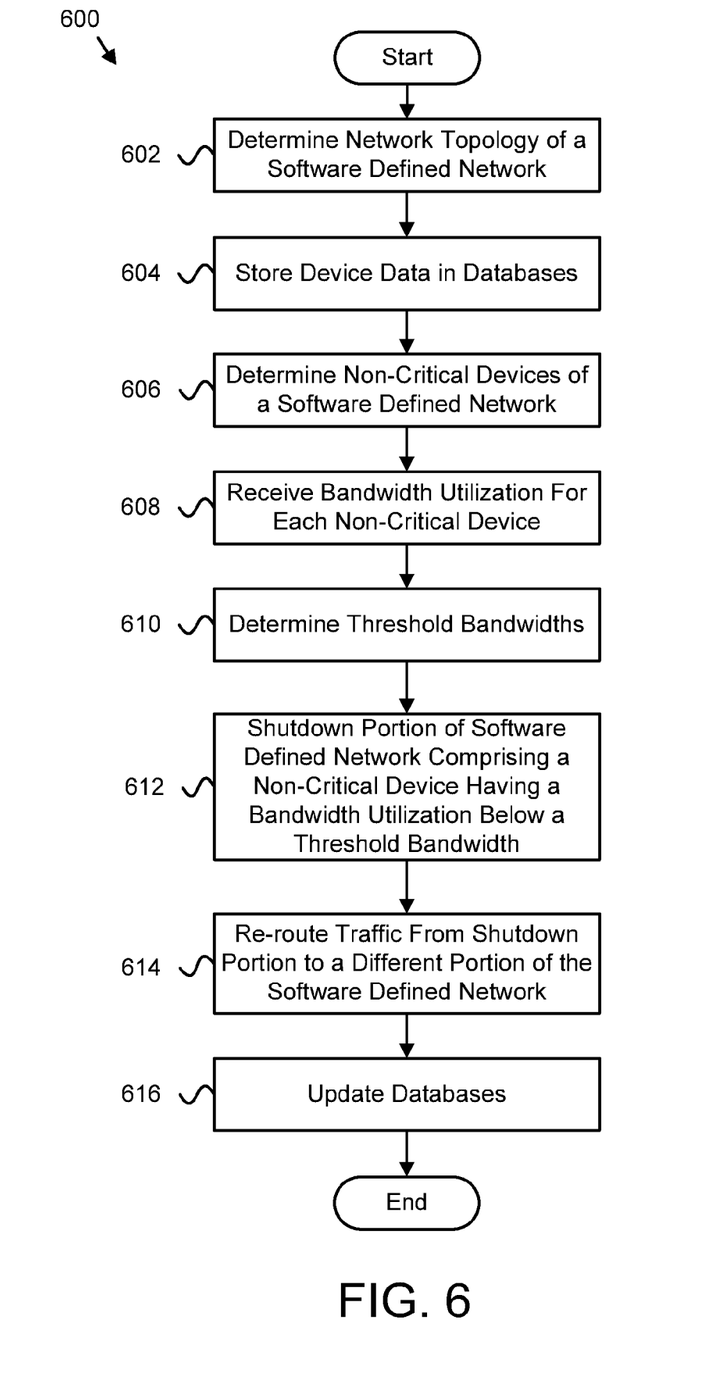
FIG. 6 is a schematic flow chart diagram illustrating one embodiment of another method for on-demand power management in a networked computing environment.

FIG. 6 is a schematic flow chart diagram illustrating one embodiment of another method 600 for on-demand power management in a networked computing environment. In one embodiment, the method 600 begins and determines 602 a network topology of a plurality of devices 112*a-n* of an SDN. In one embodiment, a network module 302 determines 602 a network topology of a plurality of devices 112*a-n* of an SDN. The network topology describes an interconnectedness between the plurality of devices 112*a-n*.

In one embodiment, the method 600 stores 604 stores 604 network data associated with each device 112*a-n* in one or more databases based on the network topology. The database module 310, in some embodiments, stores 604 network data associated with each device 112*a-n* in one or more databases. The method 600, in certain embodiments, determines 606 one or more non-critical devices 112*a-n* of the plurality of devices 112*a-n*. The device module 202 may determine 606 the one or more non-critical devices 112*a-n* of the plurality of devices 112*a-n*.

In a further embodiment, the method 600 receives 608 a bandwidth utilization for each of the one or more non-critical devices 112*a-n*. In some embodiments, the usage module 204 receives 608 a bandwidth utilization for each of the one or more non-critical devices 112*a-n*. In some embodiments, the method 600 determines 610 a threshold bandwidth for each of the non-critical devices 112*a-n*. The threshold module 308 may determine 610 the threshold bandwidth for each of the non-critical devices 112*a-n*.

In one embodiment, the method 600 shuts down 612 at least a portion of the SDN comprising the one or more non-critical devices 112*a-n* in response to the bandwidth utilizations for the one or more non-critical devices 112*a-n* being less than the determined threshold bandwidth. In one embodiment, the power module 206 shuts down 612 at least a portion of the SDN comprising the one or more non-critical devices 112*a-n*.

The method 600, in certain embodiments, re-routes 614 network traffic intended for the portion of the SDN being shutdown to portions of the SDN that are not shut down based on the determined network topology. In one embodiment, the traffic module 304 re-routes 614 the network traffic. In a further embodiment, the method 600 updates 616 one or more databases in response to the portion of the network being shut down. In certain embodiments, the database module 310 updates 616 the one or more databases, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a device module that determines one or more non-critical devices of a plurality of devices of a software defined network, wherein a non-critical device is determined based on one or more network characteristics of the device;
    a usage module that receives a bandwidth utilization for each of the one or more non-critical devices, the bandwidth utilization comprising an amount of network traffic associated with a non-critical device;
    a threshold module that sets a threshold bandwidth for one or more of a portion of the software defined network and each device of the plurality of devices of the software defined network; and
    a power module that shuts down at least a portion of the software defined network comprising the one or more non-critical devices in response to the bandwidth utilizations for the one or more non-critical devices being less than the threshold bandwidth, wherein the power module shuts down the at least a portion of the network by shutting down one of a non-critical device and a power supply for a non-critical device.

2. The apparatus of claim 1, further comprising a network module that determines a network topology of the plurality of devices of the software defined network, the network topology describing an interconnectedness between the plurality of devices.

3. The apparatus of claim 2, wherein the network topology is determined based on network data received from each device of the software defined network, the network data for a device comprising one or more of data that identifies the device and data that identifies one or more different devices that the device is connected to.

4. The apparatus of claim 3, wherein the network module updates the network topology based on one of network data received from each device connected to the software defined network and not receiving network data from a device that was previously part of the network topology and has been disconnected from the software defined network.

5. The apparatus of claim 2, further comprising a traffic module that re-routes network traffic intended for the portion of the software defined network being shutdown to portions of the software defined network that are not shut down based on the determined network topology.

6. The apparatus of claim 2, further comprising a migration module that moves one or more virtual machines from the portion of the software defined network being shut down to portions of the software defined network that are not shut down based on the determined network topology.

7. The apparatus of claim 2, wherein the network topology is determined using a link layer discovery protocol (LLDP).

8. The apparatus of claim 1, wherein the power module restarts the at least a portion of the software defined network comprising the one or more non-critical devices in response to the bandwidth utilizations for one or more different portions of the network being above a threshold bandwidth.

9. The apparatus of claim 1, wherein the usage module checks a bandwidth utilization of one or more non-critical devices at predetermined intervals and notifies the power module of a non-critical device that has a bandwidth utilization that is less than a bandwidth threshold for the non-critical device.

10. The apparatus of claim 1, further comprising a database module that maintains one or more databases associated with the plurality of devices of the software defined network, the one or more databases storing data associated with each device of the plurality of devices, the data comprising one or more of:
    a device identifier;
    a device type;
    a criticality status;
    a power status;
    a threshold bandwidth;
    a power strip identifier; and
    a power strip port.

11. The apparatus of claim 10, wherein the power module checks the one or more databases for a power strip identifier and a power strip port for each non-critical device of the portion of the software defined network being shut down and sends a signal to a power strip identified by a power strip identifier to shut down power for a device associated with a power strip port.

12. The apparatus of claim 1, wherein the one or more network characteristics defining a non-critical device comprises one or more of a bandwidth utilization of the non-critical device and a predefined status of the non-critical device.

13. A method comprising:
    determining, by use of a processor, one or more non-critical devices of a plurality of devices of a software defined network, wherein a non-critical device is determined based on one or more network characteristics of the device;

receiving a bandwidth utilization for each of the one or more non-critical devices, the bandwidth utilization comprising an amount of network traffic associated with a non-critical device;

setting a threshold bandwidth for one or more of a portion of the software defined network and each device of the plurality of devices of the software defined network; and shutting down at least a portion of the software defined network comprising the one or more non-critical devices in response to the bandwidth utilizations for the one or more non-critical devices being less than a threshold bandwidth, the at least a portion of the network being shut down by shutting down one of a non-critical device and a power supply for a non-critical device.

14. The method of claim 13, further comprising determining a network topology of the plurality of devices of the software defined network, the network topology describing an interconnectedness between the plurality of devices.

15. The method of claim 14, wherein the network topology is determined based on network data received from each device of the software defined network, the network data for a device comprising one or more of data that identifies the device and data that identifies one or more different devices that the device is connected to.

16. The method of claim 13, further comprising restarting the at least a portion of the software defined network comprising the one or more non-critical devices in response to the bandwidth utilizations for one or more different portions of the network being above a threshold bandwidth.

17. The method of claim 13, further comprising maintaining one or more databases associated with the plurality of devices of the software defined network, the one or more databases storing data associated with each device of the plurality of devices, the data comprising one or more of:
    a device identifier;
    a device type;
    a criticality status;
    a power status;
    a threshold bandwidth;
    a power strip identifier; and
    a power strip port.

18. A program product comprising a non-transitory computer readable storage medium that stores code executable by a processor, the executable code comprising code to perform:

determining one or more non-critical devices of a plurality of devices of a software defined network, wherein a non-critical device is determined based on one or more network characteristics of the device;

receiving a bandwidth utilization for each of the one or more non-critical devices, the bandwidth utilization comprising an amount of network traffic associated with a non-critical device;

setting a threshold bandwidth for one or more of a portion of the software defined network and each device of the plurality of devices of the software defined network; and shutting down at least a portion of the software defined network comprising the one or more non-critical devices in response to the bandwidth utilizations for the one or more non-critical devices being less than a threshold bandwidth, the at least a portion of the network being shut down by shutting down one of a non-critical device and a power supply for a non-critical device.

\* \* \* \* \*